United States Patent
Alves

(10) Patent No.: US 7,185,878 B2
(45) Date of Patent: Mar. 6, 2007

(54) CONTROL DEVICE FOR THE THROUGHPUT IN A CONDUIT PORTION OR SIMILAR

(75) Inventor: Anthony Alves, Colmar (FR)

(73) Assignee: Mark IV Systemes Moteurs (Société Anonyme), Courbevoie (FR)

( * ) Notice: Subject to any disclaimer, the term of this patent is extended or adjusted under 35 U.S.C. 154(b) by 0 days.

(21) Appl. No.: 10/497,768

(22) PCT Filed: Dec. 4, 2002

(86) PCT No.: PCT/EP02/13737

§ 371 (c)(1),
(2), (4) Date: Nov. 18, 2004

(87) PCT Pub. No.: WO03/048615

PCT Pub. Date: Jun. 12, 2003

(65) Prior Publication Data

US 2005/0072952 A1 Apr. 7, 2005

(30) Foreign Application Priority Data

Dec. 5, 2001 (FR) .................................. 01 15738

(51) Int. Cl.
*F16K 1/22* (2006.01)
(52) U.S. Cl. .......................... 251/305; 123/337
(58) Field of Classification Search ........ 251/305–308, 251/208; 123/337
See application file for complete search history.

(56) References Cited

U.S. PATENT DOCUMENTS

| | | | | |
|---|---|---|---|---|
| 3,298,677 A | * | 1/1967 | Anderson | 251/208 |
| 3,677,297 A | * | 7/1972 | Walton | 251/305 |
| 3,724,812 A | * | 4/1973 | Richardson | 251/306 |
| 4,356,801 A | * | 11/1982 | Graham | 123/337 |
| 4,391,247 A | | 7/1983 | Shioyama et al. | |
| 5,315,975 A | * | 5/1994 | Hattori et al. | 251/305 |
| 5,374,031 A | * | 12/1994 | Semence et al. | 251/305 |
| 5,465,696 A | * | 11/1995 | Gmelin | 251/305 |
| 5,722,366 A | * | 3/1998 | Adachi et al. | 123/337 |
| 6,047,950 A | * | 4/2000 | Pontoppidan et al. | 251/305 |
| 6,186,115 B1 | * | 2/2001 | Nishimura et al. | 251/305 |
| 6,328,281 B1 | * | 12/2001 | Jung | 251/305 |

FOREIGN PATENT DOCUMENTS

| | | |
|---|---|---|
| DE | 32 26 453 A1 | 1/1984 |
| EP | 0 589 733 A1 | 3/1994 |
| FR | 2 575 518 A1 | 7/1986 |
| FR | 2 666 395 A1 | 3/1992 |
| GB | 2120755 A | 12/1983 |

\* cited by examiner

*Primary Examiner*—John Bastianelli
(74) *Attorney, Agent, or Firm*—Gottlieb, Rackman & Reisman PC

(57) ABSTRACT

A control device for the throughput in a conduit portion a is provided. The device comprises a valve or a flap composed of a body mounted on a rotary support shaft and being displaceable between a position of maximum closure and a position of minimum closure by pivoting about said shaft. The device is characterised in that at least one shape or structure (4,4') which is at least partially obstructive, by projecting into the internal passage of said conduit portion (1) and locally reducing the passage section thereof, is present in the region of the internal face of the wall of said conduit portion. The device includes at least one cooperating surface zone (5) which intimately mates with the shape of at least one part of the imaginary surface swept by at least one segment of the external peripheral edge (6) of the body (2) of the valve or flap when pivoted.

7 Claims, 2 Drawing Sheets

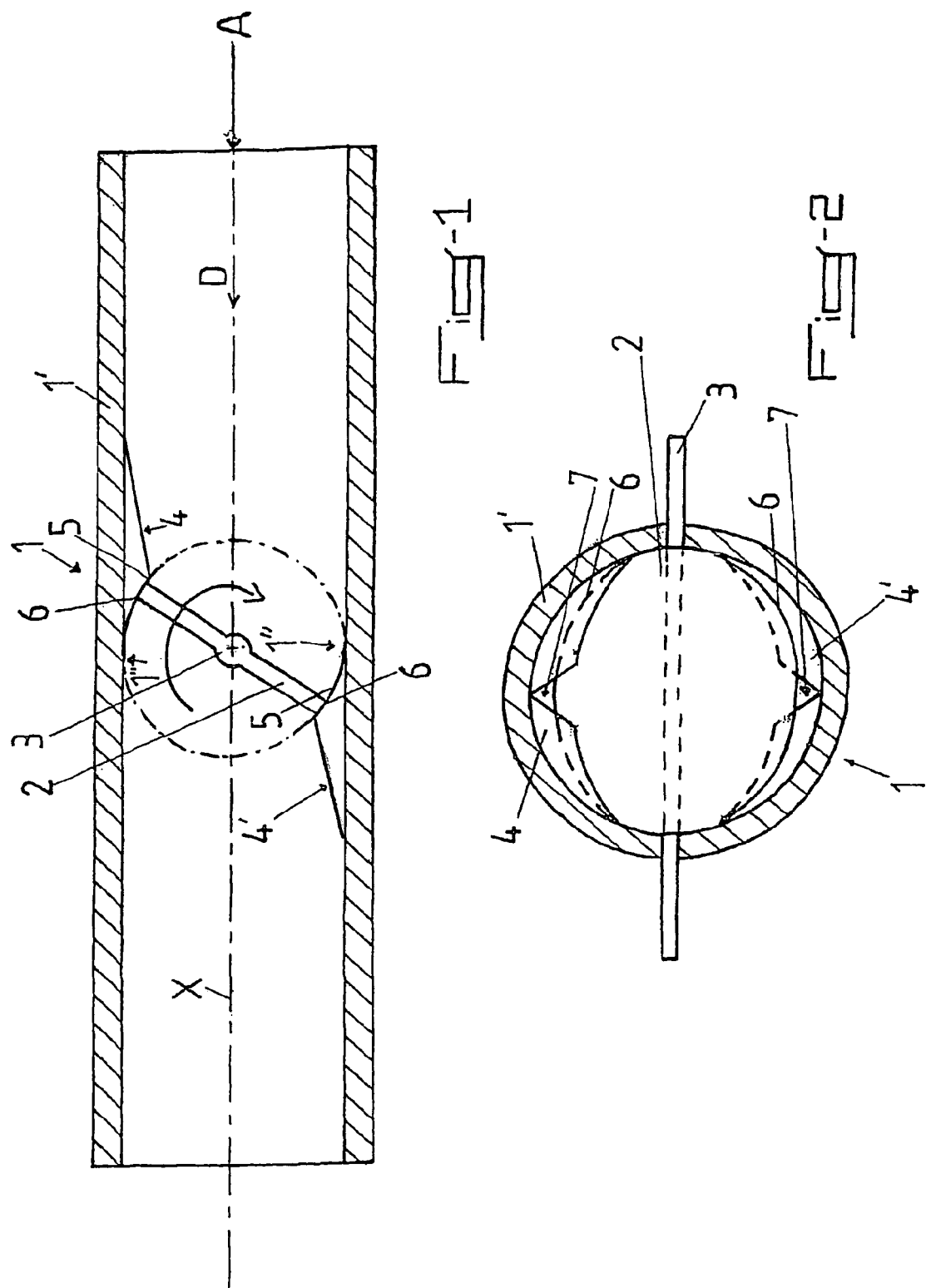

US 7,185,878 B2

CONTROL DEVICE FOR THE THROUGHPUT IN A CONDUIT PORTION OR SIMILAR

TECHNICAL FIELD

The present invention relates to the field of the control of the flow of a liquid in a conduit, a pipe or similar and relates to a control device for the throughput in a conduit portion or similar.

BACKGROUND ART

Numerous embodiments of check valves or butterfly valves are already known in which the throughput is controlled by means of a discoidal body fitted in a conduit portion, and mounted on a rotary shaft, allowing it to be displaced by pivoting between a closed position in which it totally blocks and obstructs the passage (a position which is generally perpendicular to the flow direction) and an open position, perpendicular to the previous position and in which it opposes a minimum resistance to the flow of liquid.

Such embodiments of valves or flaps are in particular described in the French patent application No. 00 02644 and in the patent application PCT No. WO 01/16473 in the name of the Applicant.

However, in these known control devices, the evolution of the throughput as a function of the opening (in other words the pivoting) of the valve body is always identical (substantially proportional), as the shape of said body is inevitably adapted to the section of the conduit—to enable closure thereof in the closing position.

However, in certain applications, it may be desirable to have an evolution which is different therefrom flowing from the variable interstice formed between the rotary body and the internal face of the wall.

Thus in certain systems for controlling the throughput, when the flap is opened, the evolution of the liquid passage section can take place too quickly for certain applications which need a wide useful range of throughput at the start of opening.

In this case it would be necessary to reconcile a flap with a large section for large throughputs with full opening and a flap with a small section for small throughputs with a small opening.

DISCLOSURE OF INVENTION

The present invention relates in particular to overcoming the above-mentioned limitations and providing, in particular a simple solution in response to the above-mentioned aim.

For this purpose, the invention relates to a control device for the throughput in a conduit portion or similar, comprising a valve or a flap composed of a body substantially of the plate type or similar mounted on a rotary support shaft and being displaceable between a position of maximum closure, possibly total closure, and a position of minimum closure by pivoting about said shaft, characterised in that at least one shape or structure which is at least partially obstructive, projecting into the internal passage of said conduit portion and locally reducing the passage section of the latter, is present in the region of the internal face of the wall of said conduit portion and comprises at least one cooperating surface zone which intimately mates with the shape of at least one part of the imaginary surface swept by at least one segment of the external peripheral edge of the body of the valve or flap when pivoted.

BRIEF DESCRIPTION OF THE DRAWINGS

The invention will be described in more detail with the aid of the description hereinafter which relates to a preferred embodiment, given by way of non-limiting example and described with reference to the attached schematic drawings, in which:

FIG. 1 is a longitudinal section of a control device according to an embodiment of the invention mounted in a conduit portion;

FIG. 2 is a view according to the arrow A (direction of flow of circulation) of the device shown in FIG. 1.

BEST MODE FOR CARRYING OUT THE INVENTION

Figure 3:
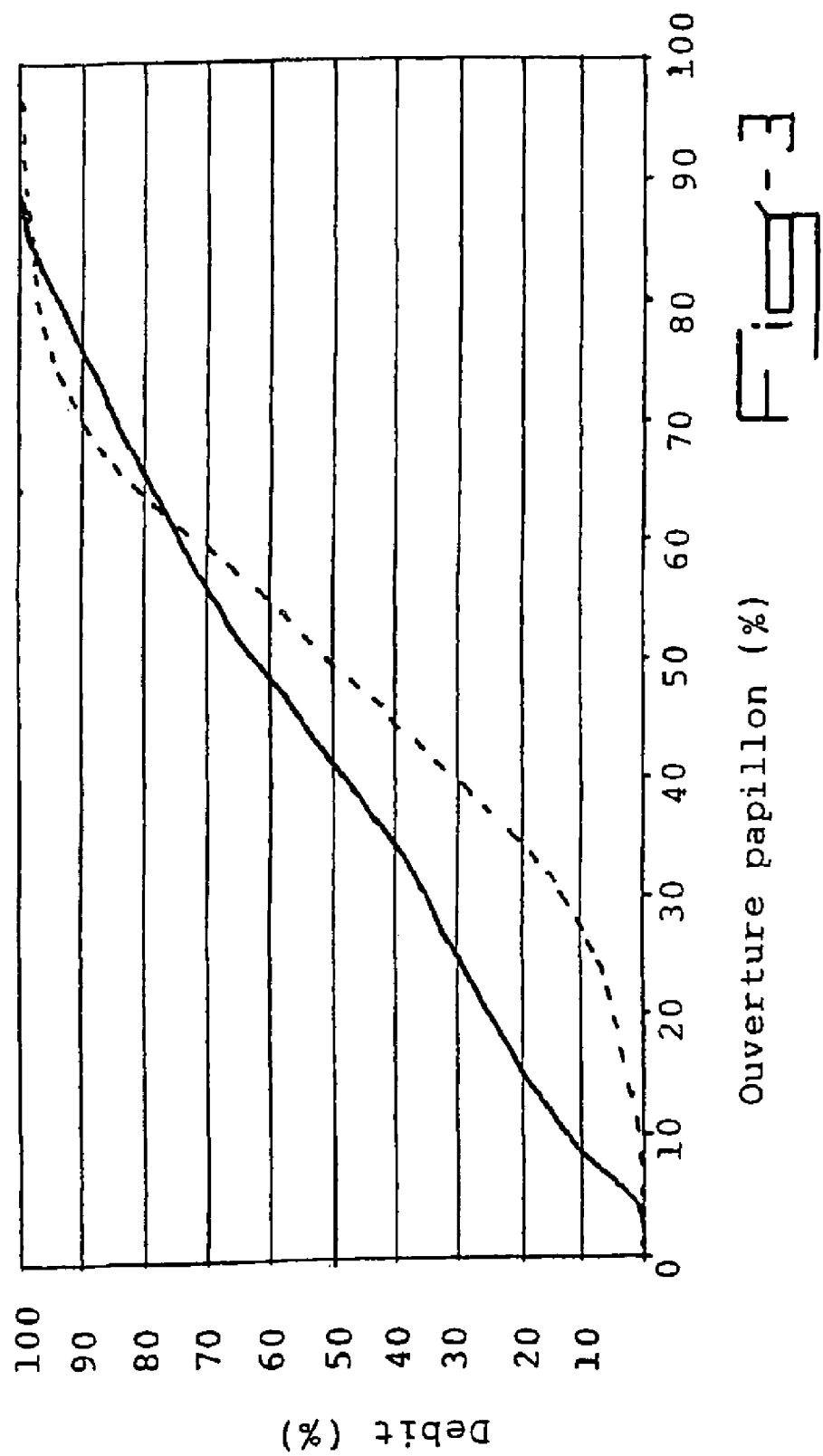
FIG. 3 shows throughput curves at constant input pressure for a control device, respectively, such as is shown in FIGS. 1 and 2 (broken line curve) and without obstructive shape or structure according to the invention (solid line curve).

FIGS. 1 and 2 of the attached drawing 4 therefore show a control device for the throughput in a conduit portion 1 or similar, comprising a valve or flap composed of a body 2, substantially of the plate type or similar, formed or rigidly mounted on a shaft 3 for support and rotation and displaceable between a maximum closure position, possibly complete closure, and a minimum closure position by rotation about said shaft 3, the latter being rotated by an external member.

According to the invention, at least one shape or structure 4, 4' which is at least partially obstructive, projecting into the internal passage of said conduit portion 1 and locally reducing the passage section of the latter, is present in the region of the internal face of the wall 1' of said conduit portion 1 and comprises at least one cooperating surface zone 5 which intimately mates with the shape of at least one part of the imaginary surface swept by at least one segment of the external peripheral edge 6 of the body 2 of the valve or flap when pivoted.

According to a first characteristic of the invention the cooperating surface zone(s) 5 of said projecting obstructive shape or structure 4, 4' extends/extend from the zone 1" of the internal face of the wall 1' of the conduit portion 1 in contact with the body 3 of the valve or flap in maximum closure position, and at most to the plane comprising, on the one hand, the rotary shaft 3, and on the other hand, the flow direction D or the longitudinal axis X of said conduit portion 1.

The passage section as seen by the liquid circulating in the conduit portion 1 will therefore be defined in cooperation with the body 2 and the obstructive shape(s) or structures 4, 4'. Said section can easily be visualised by projection onto a plane perpendicular to said flow direction D.

By acting on the size, the configuration and the view of the obstructive shape(s) or structure(s) 4, 4', the evolution of the passage section and therefore of the throughput as a function of the inclination of the body 2 of the valve or flap can be modified or adapted to very varied profiles, with progressions (continuous or otherwise), limitations, etc.

In a preferred manner, however, the configuration of the cooperating surface zone(s) 5 of each obstructive shape or structure 4, 4', possibly sub-divided into several distinct regions, is such that the total length of the line or strip portion(s) of this zone or these zones which is or are in contact with the body 2 of the valve or flap for each position thereof in a given angular range, decreases when said body 2 is pivoted from its position of maximum closure toward its position of minimum closure.

Thus, each shape or structure 4, 4' has an appearance which is tapered from its base (in the region of the internal face of the wall 1') towards its peak (innermost end) and therefore the passage section increases more and more rapidly with the rotation of the body of the valve or flap 2 towards its open position.

In order to keep a large passage section in a minimum closure position of the body 2, while allowing fine control of the flow at the start of opening of the valve or flap the cooperating surface zone(s) 5 extends/extend, as viewed from the body 2 of the valve, over an angular range of at most 45° from the maximum closure position perpendicular to the flow direction D or the longitudinal axis X of the conduit portion 1.

According to an advantageous embodiment of the invention and as shown in FIG. 2 of the attached drawings each projecting obstructive shape 4, 4' has at least one cut-out, one indent 7 and/or one through passage in the flow direction D, opening in the region of the cooperating surface zone 5 and in cooperation with the body 2 defining the passage section of said conduit portion 1 in the region of the relevant valve or flap, when said body 2 of the valve or flap is in contact with the said shape 4, 4'.

In order to also allow control in the immediate vicinity of its position of total closure, at least one indent or cut-out 7 extends to the internal face of the wall 1' of the conduit portion(s).

Thus, immediately after detachment of the body of the valve 2 from its position of complete closure (perpendicular to the flow direction D in FIGS. 1 and 2), a passage section which is limited but not zero will be defined, with the geometric characteristics perfectly determined.

According to a preferred embodiment, shown in FIGS. 1 and 2 of the attached drawings, said control device comprises two obstructive shapes or structures 4 and 4' situated on either side of the plane containing, on the one hand, the flow direction D or the longitudinal axis X of the conduit portion 1 and, on the other hand, the shaft for support and rotation 3 of the body 2 of the valve or flap, the one upstream and the other downstream of said rotary shaft 3.

The obstructive shapes and structures 4 and 4' will have different types of constitutions and exterior appearances such as, for example, a hollow or solid body, a simple wall portion or voluminal body, a profiled view or otherwise, etc.

According to a particularly advantageous embodiment of the invention, shown in the figures of the attached drawings, each obstructive shape or structure 4, 4' has, as viewed in section in planes perpendicular to the rotary shaft 3, an angular configuration with one side in the form of the arc of a circle corresponding to a or the cooperating surface zone 5, said angle being directed upstream for the shape or structure 4 located upstream of the rotary shaft 3 and directed upstream for the shape or structure 4' located downstream from the rotary shaft 3.

Owing to a configuration of this type of the shapes or structures 4 and 4', the disturbance of the flow will be limited, in particular in the position of maximum opening of the valve or flap.

Although shown in FIG. 2 with a single indent 7 in the form of a notch with a triangular section, each shape or structure 4, 4' can obviously comprise a plurality of indents of this type, optionally with different shapes, sections and sizes.

According to a first construction variation, each obstructive shape or structure 4, 4' is connected on the internal face of the wall 1' of the conduit portion 1, by mechanical fixing, adhesion or otherwise.

According to a second construction variation, each obstructive shape or structure 4, 4' is produced in one piece with the wall 1' of the conduit portion 1, if necessary obtained by deformation of this wall 1'.

Moreover, the invention may apply to conduit portions 1 of various sections, associated with valve or flap bodies 2 with corresponding shapes, in particular: rectangular, square, elliptical, or other.

However, in a conventional manner, the body 2 of the valve or flap will have a circumferential discoidal configuration or circular peripheral edge 6, the cooperating surface zone(s) 5 of the obstructive shape(s) or structure(s) 4, 4' being supported by a sphere.

Thus, in most cases of application and as shown in the figures of the drawings, the obstructive shapes 4 and 4' form evolutional profiles with a spherical contact surface zone 5 resuming the curve of the body 2 of the flap.

The cooperating surface 5 is sufficiently close to the flap to have friction contact therewith and to thus ensure sealing during opening of the flap. The shapes 4, 4' are only active at the start of opening the flap (cf. FIG. 1).

In this case there is not always a passage section for the liquid. This section is created in the spherical form by a notch 7 (FIG. 2) of a dimension such that the surface projected in the axis of the conduit is the desired passage section at a given angle.

According to the shape of the notch the desired progressivity can be obtained.

FIG. 3 shows, in a comparative manner the evolution of the throughput as a function of the opening of the body 2 of the flap for a same conduit portion 1 with and under shapes 4, 4' for a constant input pressure.

The invention is obviously not limited to the embodiment described and shown in the attached drawings. Modifications remain possible, in particular from the point of view of the constitution of the various elements or by substituting the equivalent techniques without in any way departing from the scope of protection of the invention.

The invention claimed is:

1. Control device for the throughput in a conduit portion defined by a wall and an internal passage, the control device comprising a flap composed of a plate-shaped body mounted on a rotary support shaft and displaceable between a position of maximum closure and a position of minimum closure by pivoting about said shaft, said control device including two obstructive structures projecting from an internal face of the wall of said conduit portion into the internal passage of said conduit portion, said obstructive structures being located on either side of a plane containing a longitudinal axis of said conduit portion and an axis of said rotary support shaft, one obstructive structure upstream and the other obstructive structure downstream of said rotary support shaft, each obstructive structure comprising a cooperating surface zone facing said flap and intimately mating with a revolution surface swept by at least one segment of the external peripheral edge of the body of the flap when pivoted, each obstructive structure, as viewed in section in planes perpendicular to the rotary shaft, having one side in the form of the arc of a circle corresponding to the cooperating surface zone and one inclined side sloping towards the internal face of the conduit portion, said inclined side of the obstructive structure located upstream of the rotary shaft being directed upstream, said inclined side of the obstructive structure located downstream of the rotary shaft being directed downstream, each obstructive structure having at least one indent opening in the cooperating surface zone and defining a passage section when the flap is in contact with said cooperating surface zone, the cooperating surface zone of each obstructive structure extending over an angular range no greater than 45° from the maximum closure position of said flap.

2. Device according to claim 1, wherein of the line of contact between the cooperating surface zone of each projecting obstructive structure and the body of the flap for each position thereof in said angular range has a length which decreases when said body is pivoted from its maximum closure position toward its minimum closure position.

3. Device according to claim 1, wherein said indent extends to the internal face of the wall of the conduit portion.

4. Device according to claim 1, wherein each obstructive structure is connected on the internal face of the wall of the conduit portion.

5. Device according to claim 1, wherein each obstructive structure is produced in a single piece with the wall of the conduit portion.

6. Device according to claim 1, wherein the body of the flap has a circular peripheral edge, the cooperating surface zones of the obstructive structures being spherical.

7. Device according to claim 3, wherein said indent is V-shaped in cross-section.

* * * * *